United States Patent Office 3,574,694
Patented Apr. 13, 1971

3,574,694
PREPARATION OF BETA-CHLORO ISOCYANATES
James L. Harper, Laurel, and David A. Daniels, Baltimore, Md., assignors to W. R. Grace & Co., New York, N.Y.
No Drawing. Filed Jan. 17, 1968, Ser. No. 698,415
Int. Cl. C07c 119/04
U.S. Cl. 260—453                                    4 Claims

ABSTRACT OF THE DISCLOSURE

The ethylenically unsaturated group of an organic compound is converted to a beta-chloro isocyanato group by the use of $Cl_2$, and isocyanic acid in the presence of an iodoaryl compound.

---

The present invention relates to a novel and useful process. More particularly, it relates to a process for forming beta-chloro isocyanato groups on an unsaturated compound.

Numerous isocyanato compounds are well known in the art. They have received widespread acceptance as intermediates in the formation of resins, plastics, insecticides, foams, fibers and the like. The preparation of such compounds is disclosed in U.S. Pats. 3,338,944, 3,168,545 and 3,076,788 and others.

It has now been found that beta-chloroisocyanato compounds can be formed by a new and novel process. Accordingly, it is an object of the present invention to form such compounds by utilizing an iodoaryl compound with chlorine as a source of positive chlorine. Another object is to provide a relatively simply process for the formation of beta-chloro isocyanato compounds. Other objects will become apparent as the description of the invention proceeds.

These objects are accomplished by the present invention which provides a process for forming a beta-chloro isocyanato compound which comprises reacting an organic compound containing an ethylenically unsaturated group

with $Cl_2$ and isocyanic acid at a temperature below about 30° C. in the presence of an iodoaryl compound.

In a preferred embodiment of the present invention, the reaction is carried out at a temperature below 0° C. more preferably below —30° C. In general, one molar proportion of the ethylenically unsaturated compounds is reacted with one molar proportion of the $Cl_2$ and isocyanic acid. The iodoaryl compound may be present in any amount but it is preferred that it be used in amounts of from about 0.5 to about 1.5 mole proportion per mole of unsaturated compound.

The expression "an organic compound containing an ethylenically unsaturated group" is used to signify any compound containing the

group. It includes monoolefins such as propylene, 1-butene, 1-pentene, 2-pentene, 3-pentene, 1-hexene, 2-hexene, 3-hexene, 4-hexene, 9-octadecene, 9-hexadecene, 4-methyl-1-butyl, 4-ethyl-1-butene, 4-phenyl-1-butene, 3-methyl-1-pentene, 3-(2-ethylphenyl)-1-pentene, 2-phenylethyl-2-hexene, 1-(2-tolylbutyl)-1-hexane, cyclopentene, cyclohexene, cycloheptene, cyclooctene, 3-methyl - 1 - cyclohexene, 4-ethyl-1-cyclohexene, 3-phenyl-1-cyclohexene or the like diolefins including conjugated and non-conjugated diolefins such as 1,4-butadiene, 1,3-butadiene, 1,3-1,4- or 1,5-pentadiene, 4-vinyl-1-cyclohexene, 1,3 - cyclopentadiene, bicycloheptadiene, 1-methyl-1,3-butadiene, 1-phenyl-1,3-butadiene, 6,10-hexadecadiene, 2,4-hexadiene, 9,12-octadecadiene, or the like; 1,3,5-hextriene, 1,3,5 of 1,3,6-heptatriene, etc. and other polyolefinically unsaturated compounds, eg. terpene hydrocarbons such as alpha and beta-pinene and the like. The term also includes animal and vegetable oil such as caster oil, olive oil, corn oil, cottonseed oil, linseed oil, olive oil, palm oil, peanut oil, safflower oil, soybean oil, walnut oil or the like. Polymers (such as addition polymers) containing unsaturated groups are likewise suitable for use in the present invention.

The "iodoaryl" compounds utilized in the present invention are those compounds in which an iodine group is directly attached to the aromatic nucleus. Among the various iodoaryl compound which may be employed are iodobenzene, p-methyl iodobenzene, o-methyl iodobenzene, p-methoxy, iodobenzene, p-nitrol iodobenzene, 4-nitro-2-methoxy iodobenzene, p-iodoaniline, p-iodobenzoic acid, 1-iodonaphthalene and the like. The iodoaryl compound reacts with the chlorine to form an iodobenzene dichloride complex which acts as source of positive chlorine. The complex is stable and can be separated from the solution. Thus, the use of the iodobenzene dichloride complex is the full equivalent of using chlorine with the iodobenzene compound. The reaction can thus be carried out in two stages or in a single stage.

The reaction is generally carried out in the presence of an organic solvent such as chloroform, p-chloro benzene, toluene, benzene, tetrahydrofuran, diethyl ether and the like. Other suitable solvents may likewise be employed as can mixtures of such solvents.

The following examples are given to illustrate the invention and are not intended to limit it in any manner. All parts are given in parts by weight unless otherwise expressed.

EXAMPLE 1

A 4-neck, 1-liter flask is equipped with a magnetic stirrer, a chlorine inlet, a Dry Ice acetone condenser and a thermometer. 25.76 grams (0.6 mole) of HNCO are dissolved in 420 g. of chloroform and put in the flask. 104 grams (0.5 mole) of iodobenzene are added to the flask. 50 grams (0.6 mole) of cyclohexene are added to the flask and the flask is sealed and cooled to —79° C. by the use of Dry Ice and acetone. 42.6 grams of chlorine are bubbled into the mixture in the flask over a period of about 24 minutes. The mixture is then stirred for about 2 hours. The flask is allowed to warm to a temperature of about —40° C. and the chloroform and isocyanic acid are stripped from the mixture using a vacuum (2 mm. Hg) until the volume is about 100 ml. The mixture is filtered to remove by-products. The yield (of the products below) is about 25% of theoretical.

The filtrate is analyzed by gas chromatograph and it is found that the ethylenically unsaturated group of the cyclohexene has been changed into the cis and trans 1,2-dichloro groups as well as the beta-chloro isocyanato group. The ratio of the dichloro compounds to the beta-chloro isocyanato compound is approximately 1.8:1 on a weight basis.

Control

The procedure of Example 1 is repeated omitting the iodo-benzene compound. Analysis of the product shows that no beta chloro isocyanato cyclohexane is formed.

EXAMPLE 2

The procedure of Example 1 is repeated employing p-methyl iodobenzene rather than iodobenzene.

The ratio of the dichloro compounds to the beta-chloro isocyanato compound is approximately 2.8 on a weight basis.

EXAMPLE 3

The procedure of Example 1 is repeated employing p-methoxy iodobenzene rather than iodobenzene.

The ratio of the dichloro compounds to the beta-chloro isocyanato compound is approximately 3.7 on a weight basis.

EXAMPLE 4

The procedure of Example 1 is repeated employing p-nitro iodobenzene rather than iodobenzene.

The ratio of the dichloro compounds to the beta-chloro isocyanato compound is approximately 4.9 on a weight basis.

EXAMPLE 5

The procedure of Example 1 is repeated employing 4-nitro-2-methoxy iodobenzene rather than iodobenzene.

The ratio of the dichloro compounds to the beta-chloro isocyanato compound is approximately 2.9 on a weight basis.

EXAMPLE 6

The procedure of Example 1 is repeated employing 2-methyl-2-butene in place of cyclohexene. The molar ratios are the same as in Example 1.

The ratio of the dichloro compounds to the beta-isocyanato compound is approximately 2:1 on a weight basis.

The beta-chloro isocyanate compounds of the present invention can be utilized as intermediates for various resins, plastics and the like as described in the aforementioned patents.

Many equivalent modifications will be apparent to those skilled in the art from a reading of the foregoing without a departure from the inventive concept.

What is claimed is:

1. A process for forming beta-chloro isocyanato compounds which comprise:
    (A) reacting one molar proportion of an organic ethylenically unsaturated compound selected from the group consisting of propylene, 1-butene, 1-pentene, 2-pentene, 3-pentene, 1-hexene, 2-hexene, 3-hexene, 4-hexene, 9-octadecene, 9-hexadecene, 4-methyl-1-butyl, 4-ethyl-1-butene, 4-phenyl-1-butene, 3-methyl-1-pentene, 3-(2-ethylphenyl)-1-pentene, 2-phenyl-ethyl-2-hexene, 1-(2-tolybutyl)-1-hexene, cyclopentene, cyclohexene, cycloheptene, cyclooctene, 3-methyl-1-cyclohexene, 4-ethyl-1-cyclohexene, and 3-phenyl-1-cyclohexene; with one molar proportion of $Cl_2$ and isocyanic acid at a temperature below 30° C. in the presence of from about 0.5 to about 1.5 mole proportion of an iodoaryl compound selected from the group consisting of iodobenzene, p-methyl iodobenzene, o-methyl iodobenzene, p-methoxy iodobenzene, 4-nitro-2-methoxy iodobenzene, and 1-iodonaphthalene; whereby the said iodoaryl reacts with the chlorine to form an iodoaryl dichloride complex source of positive chlorine; said reaction being carried out in the presence of an organic solvent selected from the group consisting of chloroform, p-chlor benzene, toluene, benzene, tetrahydrofuran, and diethyl ether; and thereafter
    (B) recovering the reaction product from the reaction mixture.

2. The process of claim 1 wherein the reaction is carried out at a temperature below 0° C.

3. The process of claim 1 wherein the reaction is carrier out at a temperature below −30° C.

4. The process of claim 1 wherein the iodoaryl compound is iodobenzene.

References Cited

UNITED STATES PATENTS 3,338,944    8/1967    Harper et al. _____ 260—453

OTHER REFERENCES

Garvey, Jr., et al., J. Am. Chem. Soc., vol. 59, pp. 1827–8 (1937).

Andrews et al., J. Am. Chem. Soc., vol. 80, pp. 1723–8 (1958).

Okawara et al., Chemical Abstracts, vol 58, p. 8051 (1963).

CHARLES B. PARKER, Primary Examiner

D. H. TORRENCE, Assistant Examiner

U.S. Cl. X.R.

260—80.3, 404, 404.5, 650